(12) United States Patent
Li et al.

(10) Patent No.: US 11,586,477 B2
(45) Date of Patent: Feb. 21, 2023

(54) SYSTEM AND METHOD FOR BENCHMARKING A CONTAINER ORCHESTRATION PLATFORM

(71) Applicant: VMware, Inc., Palo Alto, CA (US)

(72) Inventors: Yong Li, Fremont, CA (US); Karthik Ganesan, Austin, TX (US); Hechen Liu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 257 days.

(21) Appl. No.: 16/831,373

(22) Filed: Mar. 26, 2020

(65) Prior Publication Data
US 2021/0303365 A1    Sep. 30, 2021

(51) Int. Cl.
*G06F 9/50* (2006.01)
*G06F 9/38* (2018.01)

(52) U.S. Cl.
CPC .......... *G06F 9/5072* (2013.01); *G06F 9/3891* (2013.01); *G06F 9/5027* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 10,613,961 B2 * | 4/2020 | Chen | G06F 9/455 |
| 2003/0033118 A1 * | 2/2003 | Peddanna | H04L 67/22 |
| | | | 714/E11.193 |

OTHER PUBLICATIONS

"KBench", github.com/vmware-tanzu/k-bench, retrieved May 20, 2020, 9 pgs.
Kubernetes, "Attach Handlers to Container Lifecycle Events", kubernetes.io/docs/tasks/configure-pod-container/attach-handler-lifecycle-event/, retrieved May 20, 2020, 5 pgs.
Jens Axboe, "FIO Benchmark", github.com/axboe/fio, retrieved May 20, 2020, 5 pgs.
VMware, "VMware Project Pacific—Making Kubernetes mainstream", datacenterrookie.wordpress.com/2020/01/06/vmware-project-pacific-making-kubernetes-mainstream/, 2020, 7 pgs.
Dugan, Jon et al. "iPerf—The ultimate speed test tool for TCP, UDP and SCTP", iperf.fr/, retrieved May 20, 2020, 3 pgs.
George, Johann, "qperf—Measure RDMA and IP performance", linux.die.net/man/1/qperf, retrieved May 20, 2020, 7 pgs.
"Kubernetes Client-go", github.com/kubernetes/client-go, retrieved May 20, 2020, 4 pgs.

(Continued)

*Primary Examiner* — Eric C Wai
(74) *Attorney, Agent, or Firm* — Loza & Loza, LLP

(57) ABSTRACT

System and method for benchmarking a container orchestration platform in a computing environment uses data contained in a configuration file, which specifies at least one benchmark operation having benchmark actions for container orchestration resource types to be performed in the container orchestration platform, to create a resource manager for each container orchestration resource type specified in the configuration file. Using the created resource managers, a routine for each benchmark action is spawned and executed on container orchestration objects in the container orchestration platform. As the routines are executed, performance metrics are collected and at least some of the collected performance metrics are displayed.

20 Claims, 6 Drawing Sheets

(56) References Cited

OTHER PUBLICATIONS

"End-to-End Testing in Kubernetes", github.com/kubernetes/community/blob/master/contributors/devel/sig-testing/e2e-tests.md, retrieved May 20, 2020, 18 pgs.
Khlebnikov, Konstantin et al. "IOping", github.com/koct9i/ioping, retrieved May 20, 2020, 2 pgs.
"Kompose", kompose.io/, retrieved May 20, 2020, 3 pgs.
"Kubebench", github.com/aquasecurity/kube-bench, retrieved May 20, 2020, 9 pgs.
"Kubemark User Guide", github.com/eBay/Kubernetes/blob/master/docs/devel/kubemark-guide.md, retrieved May 20, 2020, 7 pgs.
"Benchmarking Kubernetes Networking Performance", github.com/kubernetes/perf-tests/tree/master/network/benchmarks/netperf, retrieve May 20, 2020, 3 pgs.
"SPECjbb® 2015", Standard Performance Evaluation Corporation, www.spec.org/jbb2015/, retrieved May 20, 2020, 2 pgs.
VMware Tanzu Observability by Wavefront, Website [online]. 2020 [retrieved May 20, 2020]. Retrieved from the internet: www.wavefront.com/.
"Weave Net—Weaving Containers into Applications", github.com/weaveworks/weave, retrieved May 20, 2020, 2 pgs.

\* cited by examiner

```
1  {"Timeout": 60000, # Longest running time
2   "Operations": [ # Operations to run serially
3    { # First operation
4     "Operation": {
5      "Deployments": [ # Deployment actions
6       "Actions": [
7        {
8         "Act": "CREATE",
9         "Spec": { # Use yaml to create
10         "YamlSpec": "./dep.yaml"
11        }
12       }
13      ]
14     },
15     "Count": 4 # Run 4 in parallel
16     "Pods": [ # Pod actions
17      "Actions": [
18       {
19        "Act": "CREATE",
20        "Spec": { # Use image to create
21         "Image": "k8s.gcr.io/pause",
22         "Namespace": "cluster1"
23        }
24       },
25       {
26        "Act": "RUN",
27        "Spec": { # Use label to run
28         "Command": "/root/start_workload",
29         "Labelkey": "podname",
30         "Labelvalue": "myPod"
31        }
32       }
33      ]
34     },
35     "Count": 2
36    },
37    { # Second operation ... }
38   ]
```

FIG. 3

SYSTEM AND METHOD FOR BENCHMARKING A CONTAINER ORCHESTRATION PLATFORM

BACKGROUND

Kubernetes®, which is a registered trademark of Cloud Native Computing Foundation®, is an open-source container orchestration software that automates the operation of containerized cloud applications. Kubernetes® software can support data center outsourcing to public cloud service providers or can be used for web hosting at scale. Server and mobile applications with complex custom code can be deployed using Kubernetes® software on commodity hardware to lower the costs on application provisioning with public cloud hosts and to optimize software development processes. Thus, Kubernetes® software is rapidly emerging as a mainstream platform for container orchestration in both on-premise and cloud environments.

As increasing amount of workloads are being deployed with Kubernetes® software, it is critical to understand the performance and scalability implication brought by this new paradigm on top of the already complicated physical and virtual system stack. This need, however, is impeded by the lack of a standard, accurate, and easy-to-use benchmarking tool.

SUMMARY

System and method for benchmarking a container orchestration platform in a computing environment uses data contained in a configuration file, which specifies at least one benchmark operation having benchmark actions for container orchestration resource types to be performed in the container orchestration platform, to create a resource manager for each container orchestration resource type specified in the configuration file. Using the created resource managers, a routine for each benchmark action is spawned and executed on container orchestration objects in the container orchestration platform. As the routines are executed, performance metrics are collected and at least some of the collected performance metrics are displayed.

A computer-implemented method for benchmarking a container orchestration platform in a computing environment in accordance with an embodiment of the invention includes receiving a configuration file that specifies at least one benchmark operation having benchmark actions for container orchestration resource types to be performed in the container orchestration platform, using data contained in the configuration file, creating a resource manager for each container orchestration resource type specified in the configuration file, spawning a routine for each benchmark action in the resource manager that corresponds to the container orchestration resource type for that benchmark action, executing the routines on container orchestration objects in the container orchestration platform, collecting performance metrics as the routines are executed, and displaying at least some of the collected performance metrics. In some embodiments, the steps of this method are performed when program instructions contained in a non-transitory computer-readable storage medium are executed by one or more processors.

A system for benchmarking a container orchestration platform in a computing environment in accordance with an embodiment of the invention comprises memory and at least one processor configured to receive a configuration file that specifies at least one benchmark operation having benchmark actions for container orchestration resource types to be performed in the container orchestration platform, using data contained in the configuration file, create a resource manager for each container orchestration resource type specified in the configuration file, spawn a routine for each benchmark action in the resource manager that corresponds to the container orchestration resource type for that benchmark action, execute the routines on container orchestration objects in the container orchestration platform, collect performance metrics as the routines are executed, and display at least some of the collected performance metrics.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 3 shows an example of a primary configuration file for the CO benchmark tool in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

Figure 1:
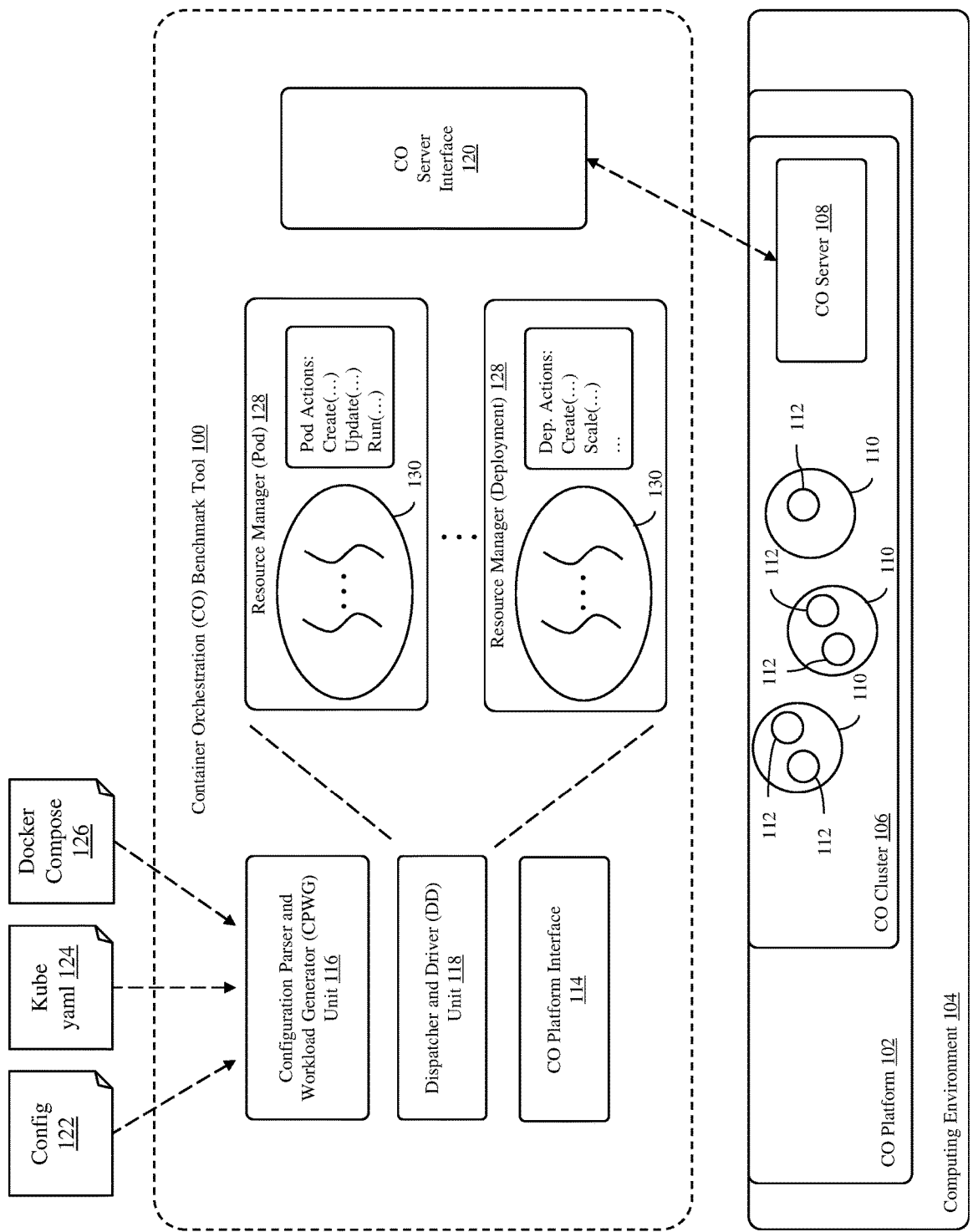
FIG. 1 is a block diagram of a container orchestration (CO) benchmark tool for a CO platform in a computing environment in accordance with various aspects of the invention.

Turning now to FIG. 1, a container orchestration (CO) benchmark tool 100 for a container orchestration platform 102 in a computing environment 104 in accordance with an embodiment of the invention is shown. In this embodiment, the container orchestration platform 102 is a Kubernetes® platform, and thus, will be described herein as such. However, the CO benchmark tool 100 may be used for other types of container orchestration platforms.

The CO benchmark tool 100 can be used to benchmark the control and data plane performance of the Kubernetes® platform 102. As described herein, the CO benchmark tool provides a highly configurable framework that can be used to manipulate a wide range of Kubernetes® resource objects (e.g., pod, deployment and services) and orchestrate representative real-world workloads with ease by using a simple configuration file along with other popular files, such as native Kubernetes® YAML (YAML Ain't Markup Language) specifications and Docker Compose files. The CO benchmark tool uses a novel mechanism that combines server-side and client-side timing information to precisely benchmark the control plane latencies. The CO benchmark tool also includes built-in containerized workloads and blueprints to evaluate single pod (i.e., a logical group of one or more containers that operate together) and aggregate cluster performance including resource efficiency through the capability of independently scaling-up and scaling-out infrastructure resource usage in terms of compute, memory, input/output and network components. The CO benchmark tool also provides a container interface to facilitate porting third-party benchmarks into the Kubernetes® platform and running them as configurations for the CO benchmark tool. Finally, the CO benchmark tool also integrates with a metric monitoring and analytics service, such as VMware Wavefront™ service, to facilitate viewing run results as dashboards, live monitoring, and analyzing infrastructure diagnostic information across stack. The CO benchmark tool will be described in more detail below.

The computing environment 104 includes hardware and software to support the Kubernetes® platform 102. The computing environment 104 may include one or more private cloud computing environments, such as on-premise data centers, and/or one or more public cloud computing environments. An example of the computing environment is illustrated in FIG. 2.

Figure 2:
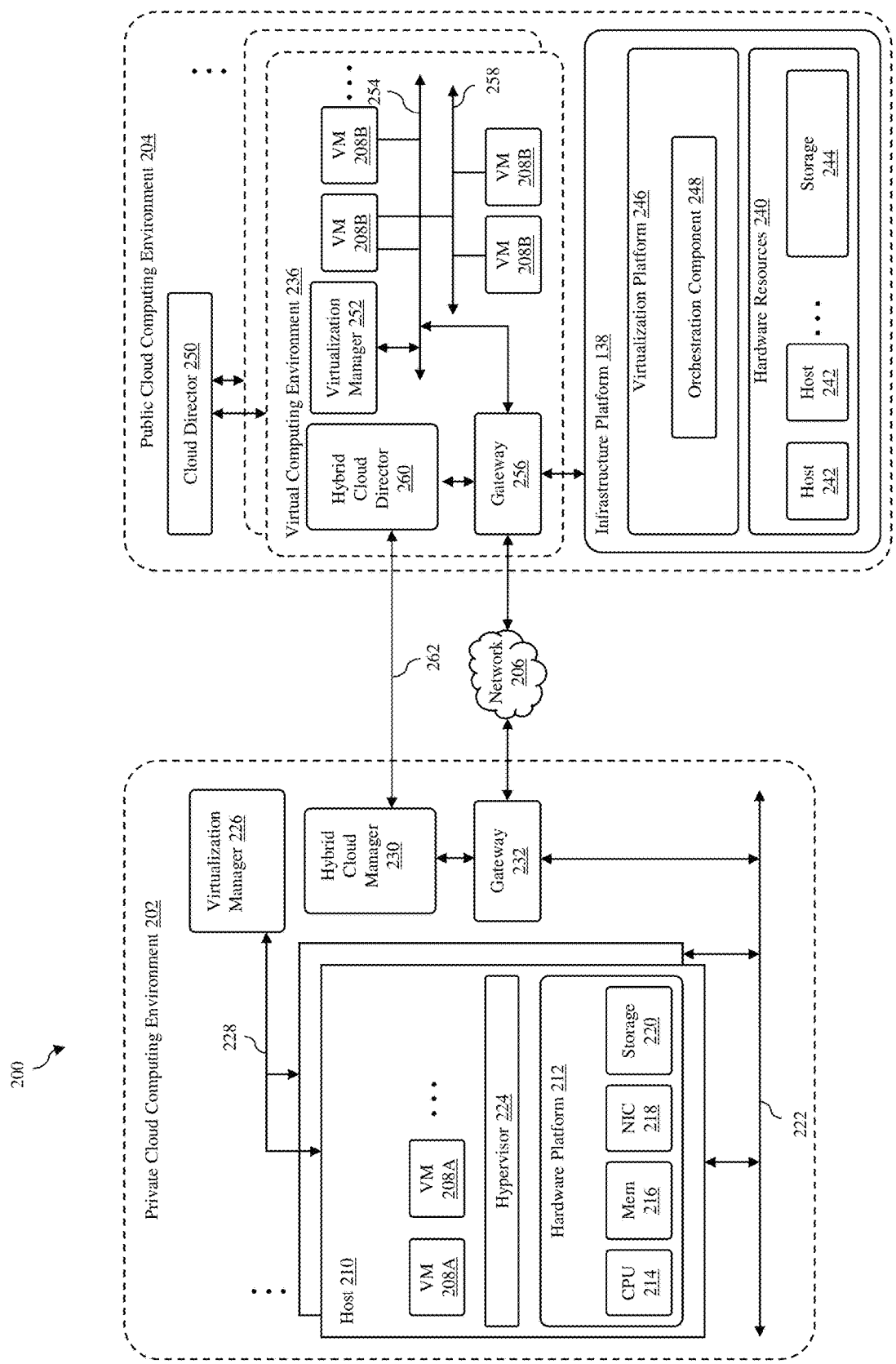
FIG. 2 illustrates an example of the computing environment shown in FIG. 1.

As shown in FIG. 2, an exemplary computing environment 200 includes at least one private cloud computing environment 202 and at least one public cloud computing environment 204 that are connected via a network 206. The computing environment 200 is configured to provide a common platform for managing and executing commands, instructions, and/or workloads seamlessly between the private and public cloud computing environments. In one embodiment, the private cloud computing environment 202 may be controlled and administrated by a particular enterprise or business organization, while the public cloud computing environment 204 may be operated by a cloud computing service provider and exposed as a service available to account holders, such as the particular enterprise in addition to other enterprises. In some embodiments, the private cloud computing environment 202 may be a private or on-premise data center. The hybrid cloud system can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment.

The private cloud computing environment 202 and the public cloud computing environment 204 of the computing environment 200 include computing and/or storage infrastructures to support a number of virtual computing instances 208A and 208B. As used herein, the term "virtual computing instance" refers to any software processing entity that can run on a computer system, such as a software application, a software process, a VM, e.g., a VM supported by virtualization products of VMware, Inc., and a software "container", e.g., a Docker container. The virtual computing instances will be described herein as being virtual machines, although embodiments of the invention are not limited to virtual machines.

Continuing to refer to FIG. 2, the private cloud computing environment 202 of the computing environment 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, storage system 220, and other I/O devices such as, for example, a mouse and a keyboard (not shown). The processor 214 is configured to execute instructions such as, for example, executable instructions that may be used to perform one or more operations described herein and may be stored in the memory 216 and the storage system 220. The memory 216 is volatile memory used for retrieving programs and processing data. The memory 216 may include, for example, one or more random access memory (RAM) modules. The network interface 218 enables the host 210 to communicate with another device via a communication medium, such as a network 222 within the private cloud computing environment. The network interface 218 may be one or more network adapters, also referred to as a Network Interface Card (NIC). The storage system 220 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 220 is used to store information, such as executable instructions, cryptographic keys, virtual disks, configurations and other data, which can be retrieved by the host.

Each host 210 may be configured to provide a virtualization layer that abstracts processor, memory, storage, and networking resources of the hardware platform 212 into the virtual computing instances, e.g., the virtual machines 208A, that run concurrently on the same host. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support software containers.

The private cloud computing environment 202 includes a virtualization manager 226 that communicates with the hosts 210 via a management network 228. In one embodiment, the virtualization manager 226 is a computer program that resides and executes in a computer system, such as one of the hosts, or in a virtual computing instance, such as one of the virtual machines 208A running on the hosts. One example of the virtualization manager 226 is the VMware vCenter Server® product made available from VMware, Inc. The virtualization manager 226 is configured to carry out administrative tasks for the private cloud computing environment, including managing the hosts, managing the VMs running within each host, provisioning VMs, migrating VMs from one host to another host, and load balancing between the hosts.

In one embodiment, the virtualization manager 226 includes a hybrid cloud manager 230 configured to manage and integrate computing resources provided by the private cloud computing environment 202 with computing resources provided by the public cloud computing environment 204 to form a unified "hybrid" computing platform. The hybrid cloud manager is configured to deploy virtual computing instances, e.g., virtual machines 208A, in the private cloud computing environment, transfer VMs from the private cloud computing environment to the public cloud computing environment 204, and perform other "cross-cloud" administrative tasks. In one implementation, the hybrid cloud manager 230 is a module or plug-in to the virtualization manager 226, although other implementations may be used, such as a separate computer program executing in any computer system or running in a virtual machine in one of the hosts. One example of the hybrid cloud manager 230 is the VMware® HCX™ product made available from VMware, Inc.

In one embodiment, the hybrid cloud manager 230 is configured to control network traffic into the network 206 via a gateway device 232, which may be implemented as a virtual appliance. The gateway device 232 is configured to provide the virtual machines 208A and other devices in the private cloud computing environment 202 with connectivity to external devices via the network 206. The gateway device 232 may manage external public Internet Protocol (IP) addresses for the virtual machines 208A and route traffic incoming to and outgoing from the private cloud computing environment and provide networking services, such as firewalls, network address translation (NAT), dynamic host configuration protocol (DHCP), load balancing, and virtual private network (VPN) connectivity over the network 206.

The public cloud computing environment 204 of the computing environment 200 is configured to dynamically provide an enterprise (or users of an enterprise) with one or more virtual computing environments 236 in which an administrator of the enterprise may provision virtual computing instances, e.g., the virtual machines 208B, and install and execute various applications in the virtual computing instances. The public cloud computing environment 204 includes an infrastructure platform 238 upon which the virtual computing environments can be executed. In the particular embodiment of FIG. 2, the infrastructure platform 238 includes hardware resources 240 having computing resources (e.g., hosts 242), storage resources (e.g., one or more storage array systems, such as a storage area network (SAN) 244), and networking resources (not illustrated), and a virtualization platform 246, which is programmed and/or configured to provide the virtual computing environments 236 that support the virtual machines 208B across the hosts 242. The virtualization platform 246 may be implemented using one or more software programs that reside and execute in one or more computer systems, such as the hosts 242, or in one or more virtual computing instances, such as the virtual machines 208B, running on the hosts.

In one embodiment, the virtualization platform 246 includes an orchestration component 248 that provides infrastructure resources to the virtual computing environments 236 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 202, the virtualization platform may be implemented by running on the hosts 242 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 204.

In one embodiment, the public cloud computing environment 204 may include a cloud director 250 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 2148 to instantiate the requested virtual machines (e.g., the virtual machines 208B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 236 may be configured as virtual data centers. Each virtual computing environment includes one or more virtual computing instances, such as the virtual machines 208B, and one or more virtualization managers 252. The virtualization managers 252 may be similar to the virtualization manager 226 in the private cloud computing environment 202. One example of the virtualization manager 252 is the VMware vCenter Server® product made available from VMware, Inc. Each virtual computing environment may further include one or more virtual networks 254 used to communicate between the virtual machines 208B running in that environment and managed by at least one networking gateway device 256, as well as one or more isolated internal networks 258 not connected to the gateway device 256. The gateway device 256, which may be a virtual appliance, is configured to provide the virtual machines 208B and other components in the virtual computing environment 236 with connectivity to external devices, such as components in the private cloud computing environment 202 via the network 206. The gateway device 256 operates in a similar manner as the gateway device 232 in the private cloud computing environment.

In one embodiment, each virtual computing environments 236 includes a hybrid cloud director 260 configured to communicate with the corresponding hybrid cloud manager 230 in the private cloud computing environment 202 to enable a common virtualized computing platform between the private and public cloud computing environments. The hybrid cloud director may communicate with the hybrid cloud manager using Internet-based traffic via a VPN tunnel established between the gateways 232 and 256, or alternatively, using a direct connection 262. The hybrid cloud director and the corresponding hybrid cloud manager facilitate cross-cloud migration of virtual computing instances, such as virtual machines 208A and 208B, between the private and public computing environments. This cross-cloud migration may include both "cold migration" in which the virtual machine is powered off during migration, as well as "hot migration" in which the virtual machine is powered on during migration. As an example, the hybrid cloud director 260 may be a component of the HCX-Cloud product and the hybrid cloud manager 230 may be a component of the HCX-Enterprise product, which are provided by VMware, Inc.

Turning back to FIG. 1, the Kubernetes® platform 102 can be any Kubernetes® platform that supports a CO cluster 106, such as Kubernetes® cluster, to operate, such as VMware vSphere® cloud provider platform, an openshift platform or a GKE platform. The Kubernetes® cluster 106 includes a CO server 108, such as a Kubernetes® server, and nodes 110, which can support one or more pods 112. In an embodiment, the nodes 110 may be host computers and the pods 112 may be virtual computers. Regardless of the Kubernetes® platform used in the computing infrastructure, the CO benchmark tool 100 is able to interface with the Kubernetes® platform 102 using a platform support interface 114, which may be configured to interface with different types of Kubernetes® platforms.

As shown in FIG. 1, the CO benchmark tool 100 includes a configuration parsing and workload generating (CPWG) unit 116, a dispatching and driver (DD) unit 118, the platform support interface 114 and a container orchestration server interface 120. These components of the CO benchmark tool 100 can be implemented in hardware and/or software. In a particular implement, the entire CO benchmark tool is implemented as one or more software programs running on one or more physical computers, such as the host computers 210 shown in FIG. 2, or running on one or more VCIs, such as the virtual machines 208A and/or 208B shown in FIG. 2.

The CPWG unit 116 of the CO benchmark tool 100 provides a rich set of configuration options to use in the CO benchmark tool. The CPWG unit is designed to receive primary configuration files 122, which are specifically designed to be used in the CO benchmark tool. In an embodiment, the primary configuration files may be JavaScript Object Notation (JSON) files. An example of a primary configuration file is shown in FIG. 3, which will be further described below. In an embodiment, the CPWG unit is able process primary configuration files that refer to other Kubernetes® YAML specifications. This allows users to run their own applications on top of the CO benchmark tool by specifying YAML files of various resources. Thus, the CPWG unit supports Kubernetes® YAML files 124. In addition, the CPWG unit may include one or more converters to support different configuration files, such as Docker Compose files 126, for launchings multi-container applications. In an embodiment, the CPWG unit supports Docker Compose files with the integration of Kompose, a tool that converts a Docker Compose file into Kubernetes® resources, such as deployments and services. This gives users high flexibility in running containerized applications written in Docker Compose, in addition to the standard Kubernetes® applications.

The CPWG unit 116 receives all the configuration files, which may include one or more primary configuration files 122, one or more Kubernetes® YAML files 124 and/or one or more Docker Compose files 126. The CPWG unit then parses all the configuration files and generates a work plan to execute various actions specified in the configuration files as input for the DD unit 118. Thus, the generated work plan includes information specified in the configurations.

In the CO benchmark tool 100, a benchmark specification is provided for each run, typically consisting of multiple Kubernetes® resources, benchmark actions and benchmark operations to manipulate these resources. As used herein, a benchmark operation is a list of different types of Kubernetes® resource objects, each with its own set of actions. As used herein, an action is an intention to manipulate a Kubernetes® resource object with a given specification using Kubernetes® API calls. As an example, an action can be CREATE, GET, LIST, UPDATE, SCALE, RUN, COPY or DELETE.

Multiple benchmark operations in the specification are executed serially, one after another. For each Kubernetes® resource, multiple actions in an action list also run one after another. The action lists of different resource types within an operation are run in parallel. The CO benchmark tool leverages the Kubernetes® labels to filter and apply actions on selected resources.

An example run specification is shown in FIG. 3, which illustrates a primary configuration JSON file. In this example, the first operation contains a list of resources, which include deployments (specified by lines 6-16) and pods (lines 17-35). Deployments have a CREATE action with a Count of 4, which indicates four Go routines will be spawned and each will create a deployment resource object. Go routines can be thought as functions that run concurrently and this parameter in the CO benchmark tool 100 enables the user to control the concurrency of the CO benchmark tool workload. For Pods, two Go routines will create 2 pods in parallel with the four deployment creation, as they are actions in the same operation. After the creations complete (or a specified timeout), two Go routines will start to run the RUN action (lines 26-33) on the pods filtered based on the specified labels. Since the deployments' action list only contains one CREATE action, no deployment related actions will run this time together with the pods' RUN action.

After all the actions in the first operation complete, the second operation will start if one (line 35) is specified. In addition to supporting user defined Kubernetes® resource object workflow as illustrated in this example, the CO benchmark tool 100 also comes with predefined blueprints for other benchmark tools, such as SPECjbb2015, Redis Memtier, FIO, IOping, Iperf3, Qbench and ping, as containerized benchmarks to stress the data plane on different resource types of compute, memory, input/output (I/O) and network. The CO benchmark tool's flexible configuration options allow users to extend and run with more workflows and third-party benchmarks in a variety of ways that are representative of real-world scenarios.

The DD unit 118 of the CO benchmark tool 100 receives the work plan from the CPWG unit 116 and reads the work plan information (i.e., the parsed configuration). Depending on the work plan information, the DD unit creates a set of resource managers 128, each for a Kubernetes® resource type. The Kubernetes® resource types may include, but not limited to, Pod, Deployment, Service, Namespace, ReplicationController, StatefulSet, ConfigMap, Endpoints, Event, ComponentStatus, Node, LimitRange, PersistentVolumeClaim, PersistentVolume, PodTemplate, ResourceQuota, Secret, ServiceAccount, Role, RoleBinding, ClusterRole and ClusterRoleBinding. The resource managers 128 may provide lifecycle management, container interface, viewing service interface, and statistics/events collection functions/modules for the corresponding types of resources. For example, if the work plan contains any pod related operations, the DD unit will create a "pod" resource manager to maintain pod resources for the benchmark. The lifecycle management module provides a control layer for Kubernetes® resource creation and cleanup according to the benchmark's running state and user configuration. This module is also used to perform user-specified resource manipulation actions to be measured, including CREATE, GET, LIST, UPDATE, SCALE, and DELETE. In addition to the resource control, the resource managers of certain resource types (i.e., pod, deployment, etc.) provide a container interface, through which users can launch data-plane actions such as RUN and COPY in the containers of selected resources. With the container interface, the CO benchmark tool supports moving files into and out of containers, and executing virtually any command sequences. This feature, combined with Kompose integration, is useful to "kubernetize" third-party benchmarks and applications. The CO benchmark tool adopts a client-server hybrid, event callback mechanism to collect timing information accurately. In addition, each resource manager maintains its own thread pool 130 to parallelize resource actions.

The CO benchmark tool 100 can be extremely flexible in that it allows virtually any supported actions performed with user chosen parameters on selected resource objects serially, in parallel, or in a hybrid manner. To achieve this, a crucial problem to address is to determine how actions and resources are handled or partitioned by different threads. Such a process is referred to herein as "workload dispatch".

In an embodiment, dispatch for actions is performed as follows. The CPWG unit 116 scans an entire configuration file and determines the maximum concurrency for each operation by summing up all the actions of different resource types in the operation. In a particular implementation, the process of summing up all the actions may involve summing up all "Count" fields of different resource types in the operation, as set forth in the input configuration file. The DD unit 118 then spawns and maintains all Go routines in the thread pools 130 of the resource managers 128 created for the actions specified in the configuration file so that corresponding actions of different types of resources in an operation are fully parallelized. Different actions for the same resource in the operation share the same Go routine and are executed in order.

To provide the user the flexibility to achieve various workload dispatch patterns, the CO benchmark tool 100 lets the user filter Kubernetes® objects using standard Kubernetes® labels to apply some actions to a filtered set of objects. The CO benchmark tool also provides implicit system defined label assignments to the various Kubernetes® resources that are created based on operation identifications (IDs) and Go routine IDs, which are also available to the user for resource filtering. The DD unit 118 of the CO benchmark tool uses pre-built data plane workloads to take advantage of these features to provide blueprints that orchestrate specific data plane workload runs and provide the results. For example, network workloads use labels affinitize selected pods to nodes to specifically measure network performance between pods within and across nodes.

One of the major drawbacks of existing Kubernetes® benchmarks is that the time results reported are not accurate. This is because all the long running object manipulations (e.g., create a deployment) in Kubernetes® are asynchronous and clients rely on the coarse-grained event timestamps provided by the Kubernetes® api-master. This limits deep investigation and detailed performance analysis with those existing benchmark tools. To address this issue, the CO benchmark tool 100 introduces a hybrid approach that combines client-side and server-side time information based on Kubernetes®' event handler mechanism. Each resource manager 128 registers various events of interests and adds handlers for event callbacks. When a handler is invoked upon an event, the handler records client-side time with microseconds accuracy, server-side timestamp, as well as other useful information, including the resource object's status, the triggering reason, and the conditions associated with the event. Based on the collected information, the CO benchmark tool calculates various metrics. This is the statistics/events collection functionality of the resource managers 128 that are created by the CO benchmark tool.

Some example control-plane metrics (client-side) at microseconds precision are shown in Table 1 below.

TABLE 1

| Metrics | Definition | Notes |
|---|---|---|
| Pod scheduling latency | $T_{sched}$ - $T_{watch}$ | $T_{sched}$: the first time when client watches that a pod's pod.Status.Conditions has a PodScheduled condition; $T_{watch}$: the first time the client watches the pod (no PodScheduled) |
| Pod initialization latency | $T_{initd}$ - $T_{sched}$ | $T_{initd}$: the first time when client watches that a pod's pod.Status.Conditions has a PodInitialized condition; $T_{sched}$: same as above |
| Pod starting | $T_{running}$ - | $T_{running}$: the first time when client watches |

TABLE 1-continued

| Metrics | Definition | Notes |
|---|---|---|
| latency | $T_{initd}$ | that pod.Status.Phase becomes running; $T_{initd}$: same as above |
| Pod startup total latency | $T_{running}$ - $T_{watch}$ | $T_{running}$: same as above; $T_{watch}$: same as above |
| API invoke latency | $T_{ret}$ - $T_{invoke}$ | $T_{ret}$: time when an API return; $T_{invoke}$: time when the API was invoked |

The performance metrics of the pre-built data plane workloads for the four resource categories are shown in Table 2 below.

| Metrics | Resource Category | Benchmark | Notes |
|---|---|---|---|
| Transaction Throughput (critical - jOPS) | CPU/ Memory | SPECJbb2015 | Maximum achievable Java transaction throughput under tight latency bounds. Individually configure to be CPU and/or memory intensive |
| Transaction latency (ms) | CPU/ Memory | SPECJbb2015 | 50, 90, 95 and 99 percentile of transaction latency |
| Transaction throughput and latency | CPU/ Memory | Redis Memtier | Maximum transaction rate achieved for a mix of operations supported by the Redis server and the corresponding latency of the operations. |
| I/O bandwidth (IOPS) | I/O | FIO | Maximum read and write bandwidth for various mix of read-write ratios, block sizes etc. on Ephemeral and Persistent Kubernetes ® volumes |
| I/O latency (ms) | I/O | Ioping | Disk I/O latency on Ephemeral and Persistent Kubernetes ® volumes over a period of time |
| Network bandwidth (Gbits/s) | Network | Iperf3 | Inter-pod network performance for TCP, UDP with varying pod placements on same and different Kubernetes ® nodes, zones, regions |
| Network latency (μs) | Network | Qperf3 | Inter-pod network latency with varying pod placements on same and different Kubernetes ® nodes, zones, regions |

In an embodiment, the data plane results of various benchmarks are sent to a metric monitoring and analytics service in real time via the analytics service interface provided by the resource managers 128. In addition, these data plane results are also made available on the DD unit 118 at the end of each run. In an embodiment, the metric monitoring and analytics service is VMware Wavefront™ service, which is a cloud-hosted service where users can inject time-series data from all layers of a software stack. Wavefront service is real time since the injected data is immediately available to be viewed graphically and can be queried using a powerful query language. In this embodiment, the CO benchmark tool 100 may features Wavefront integration for both control and data plane results. The control plane related results are immediately available after a run completes and the data plane workload results are available real-time. Using a viewing software, such as Waverunner software, the CO benchmark tool can also provide live telemetry over the entire infrastructure stack (more than 1000 metrics for a Linux node and 50,000 metrics for a VMware ESX® node). With the data plane application metrics and the telemetry data available using the Wavefront service, one can setup dashboards with their metrics of choice to monitor, analyze and correlate behaviors across the stack. For example, the fact that a latency spike of a specific workload happens together with a high disk IO may indicate a performance issue caused by the underlying storage.

The CO server interface 120 of the CO benchmark tool 100 operates to communicate with the Kubernetes® server 108 running on the Kubernetes® platform 102 to execute the specified actions in the work plan. In an embodiment, the CO benchmark tool uses the Kubernetes®' client-go, which is the official client library for the Go programming language that is used to communicate with the Kubernetes® server. It is important that the client is able to drive enough load to the Kubernetes® cluster without any performance bottlenecks on the client side. To minimize the client-side overhead, which may become a bottleneck at scale, the CO benchmark tool uses a configurable session sharing mechanism where user can specify the number of Go routines that share one session based on their machine and network capabilities. Additionally, the CO benchmark tool uses dedicated session and threads (outside the resource managers' thread pools) for event handling to mitigate their interference with sessions and threads used for user-specified resource actions.

With blueprints and built-in containerized workloads capable of scaling-up (use more resources from single container) and scaling out (add more containers to use more resources) independently on all four resource dimensions, users of the CO benchmark tool 100 can simulate and study any combination of resource usage scenario on any Kubernetes® platform.

One important aspect of a Kubernetes® cluster is the performance of its control plane, which includes, for example, resource object life cycle operations, resource scheduling and initialization. The CO benchmark tool 100 supports benchmarking user specified control plane actions and reports respective metrics. As a simple example, a user could configure the CO benchmark tool to run pod creation, listing, and updating actions with different number of parallel clients, and the CO benchmark tool will execute and report the latency, throughput, and API response time metrics for those actions at different percentiles.

Figure 4:
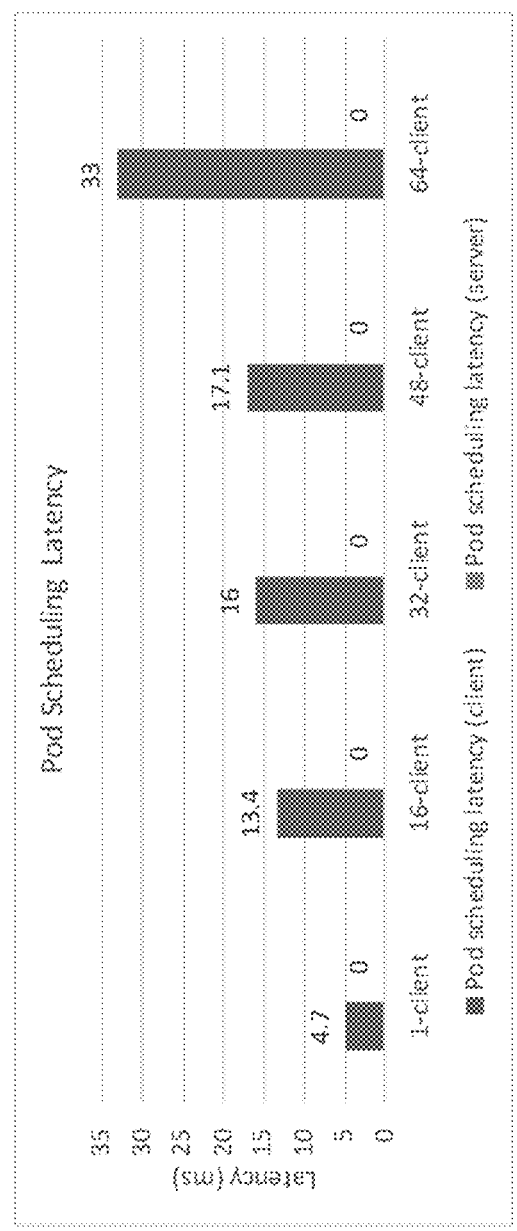
FIG. 4 illustrates the scheduling latency on the pod creation path with different numbers of clients on a cluster using the CO benchmark tool.

As an example, FIG. 4 illustrates the scheduling latency on the pod creation path with 1, 16, 32, 48, and 64 clients on a 32-node Openshift cluster using the CO benchmark tool 100. The pod scheduling latency (server) is the conventional server-side metric reported in Kubernetes® official performance test, while pod scheduling latency (client) is one of the CO benchmark tool's client-side metrics. In a detailed performance study where latency components are at milliseconds granularity, the conventional server metrics simply report all 0s, as shown in FIG. 4. For example, while 4.7 ms latency is shown for 1-client pod scheduling latency using the CO benchmark tool, the conventional server metrics reports 0. In this case, the CO benchmark tool provides more accurate metrics and allows users to understand how scheduling latency scales with an increasing number of clients. For example, the performance results in FIG. 4 indicate that when the number of clients reaches 64, there is a significant latency increase along the scheduling path of the tested system in comparison to 48 clients.

Another useful feature of the CO benchmark tool 100 is the latency breakdown for resource creation operations. An example of a report showing the latency of a deployment creation operation with concurrency level of 1 is shown in Table 3 below.

TABLE 3

| Category | Latency (ms) |
| --- | --- |
| Scheduling | 13.2 |
| Kubelet initialization | 14.8 |
| Starting | 2636 |

As shown in Table 3, instead of reporting only the total end-to-end deployment creation latency, the CO benchmark tool 100 breaks it down into three components on the critical path: starting latency, initializing latency and scheduling latency. This gives the user more detailed knowledge about which component in the deployment creation process is the bottleneck and thus needs further investigation and improvement. In the case shown in Table 3, scheduling takes 13:2 ms and initializing with the kubelet agent takes 14:848 ms. By contrast, the pod starting latency on the cluster node takes 2636 ms and dominates the creation operation.

Figure 5:
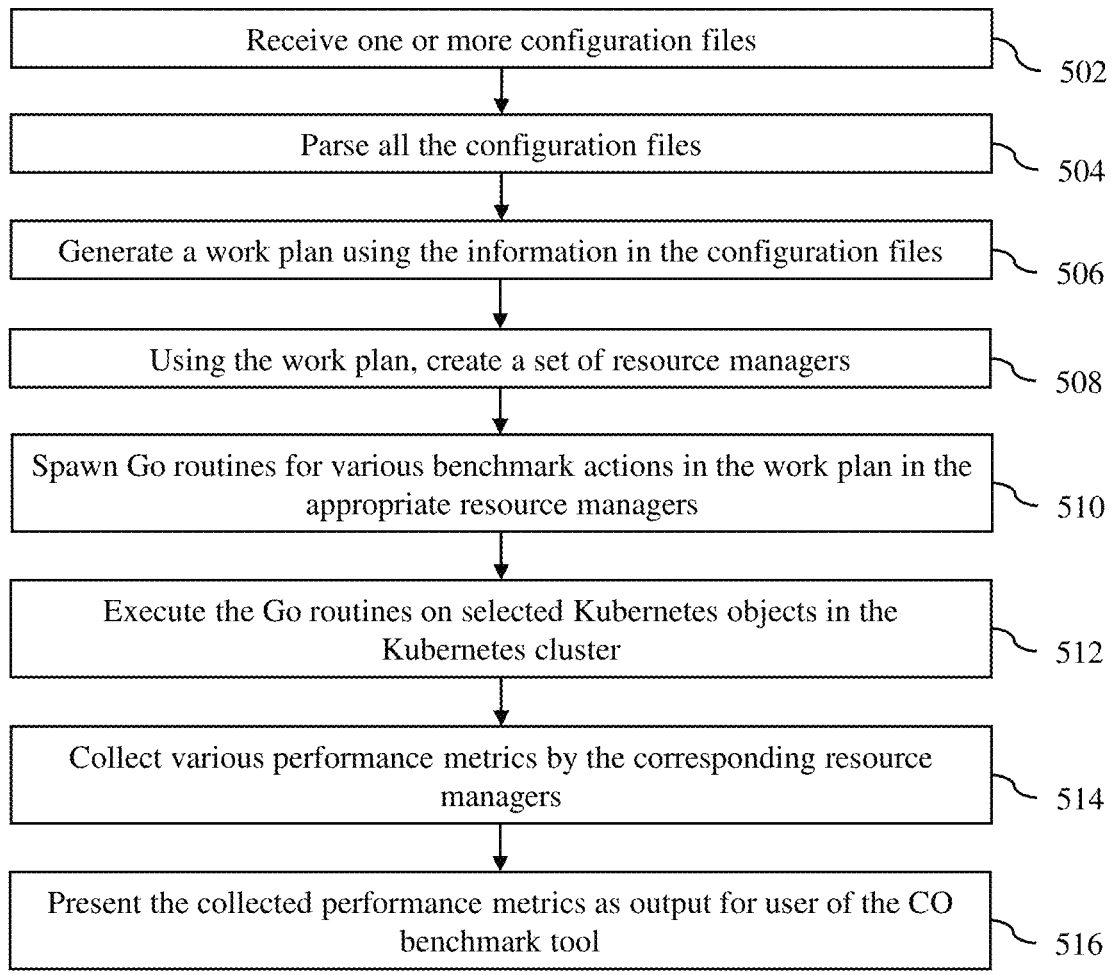
FIG. 5 is a flow diagram of a process of benchmarking the CO platform in the computing environment using the CO benchmark tool in accordance with an embodiment of the invention.

FIG. 5 is a flow diagram of a process of benchmarking the Kubernetes® platform 102 in the computing environment 104 using the CO benchmark tool 100 in accordance with an embodiment of the invention. At block 502, one or more configuration files are received at the CPWG unit 116 of the CO benchmark tool. The configuration file may include one or more primary configuration files 122, one or more Kubernetes® YAML files 124 and/or one or more Docker Compose files 126.

Next, at block 504, all the configuration files are parsed by the CPWG unit 116 of the CO benchmark tool 100. As part of this process, the CPWG unit determines the maximum concurrency for each operation by summing up all the Count fields of different resource types in the operation, as specified in the configuration files.

Next, at block 506, a work plan is generated by the CPWG unit 116 using the information in the configuration files. In an embodiment, the work plan includes information regarding benchmark operations, Kubernetes® resource types and benchmark actions, as well as execution order of the benchmark operations and actions.

Next, at block 508, using the work plan, a set of resource managers 128 are created by the DD unit 118 of the CO benchmark tool 100. Each created resource manager is designed to manage a particular Kubernetes® resource type.

Next, at block 510, Go routines for various benchmark actions in the work plan are spawned in the appropriate resource managers by the DD unit 118. Next, at block 512, the Go routines are executed on selected Kubernetes® objects in the Kubernetes® cluster 106 under the direction of the DD unit 118. These Go routines may be executed serially, in parallel or in a hybrid manner.

Next, at block 514, various performance metrics are collected by the corresponding resource managers 128 as the Go routines are executed. As an example, any performance metrics related to pod operations will be collected by the "pod" resource manager.

Next, at block 516, the collected performance metrics is presented as output for user of the CO benchmark tool 100. As an example, the collected performance metrics may be displayed on a user device in response to user input/query. In an embodiment, the collected performance metrics may be sent to VMware Wavefront™ to facilitate viewing run results as dashboards, live monitoring, and analyzing infrastructure diagnostic information across stack.

Figure 6:
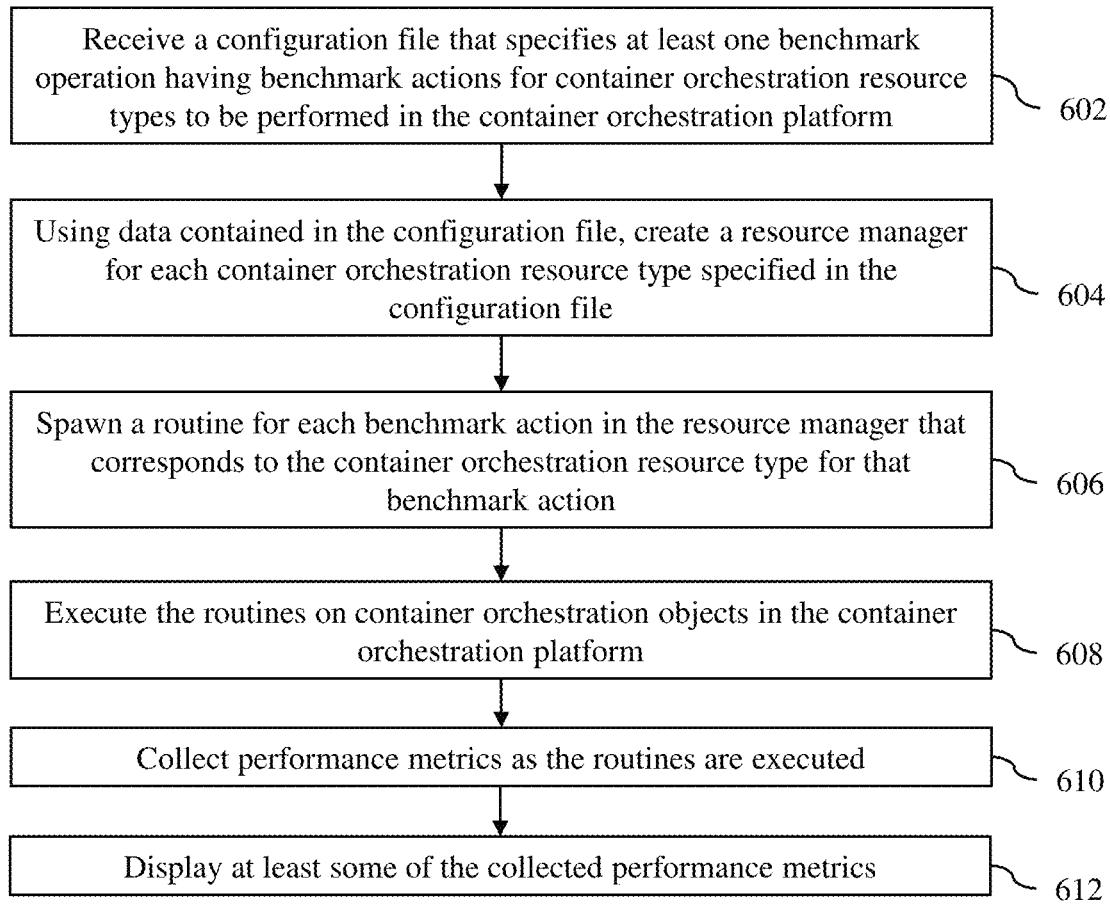
FIG. 6 is a flow diagram of a computer-implemented method for benchmarking a container orchestration platform in a computing environment in accordance with an embodiment of the invention.

A computer-implemented method for benchmarking a container orchestration platform in a computing environment, such as the Kubernetes® platform 102 in the computing environment 104, in accordance with an embodiment of the invention is described with reference to a flow diagram of FIG. 6. At block 602, a configuration file that specifies at least one benchmark operation having benchmark actions for container orchestration resource types to be performed in the container orchestration platform is received. At block 604, using data contained in the configuration file, a resource manager for each container orchestration resource type specified in the configuration file is created. At block 606, a routine for each benchmark action in the resource manager that corresponds to the container orchestration resource type for that benchmark action is spawned. At block 608, the routines are executed on container orchestration objects in the container orchestration platform. At block 610, performance metrics are collected as the routines are executed. At block 612, at least some of the collected performance metrics is displayed. In some embodiments, this method is performed by a container orchestration benchmark tool, such as the CO benchmark tool 100.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for benchmarking a container orchestration platform in a computing environment, the method comprising:
   receiving a configuration file that specifies at least one benchmark operation having benchmark actions for different container orchestration resource types to be performed in the container orchestration platform;
   using data contained in the configuration file, creating a resource manager for each of the different container orchestration resource types specified in the configuration file, wherein at least some of the resource managers that are created include a container interface;
   spawning a routine for each benchmark action in the resource manager that corresponds to the container orchestration resource type for that benchmark action;
   executing the routines on container orchestration objects in the container orchestration platform;
   collecting performance metrics as the routines are executed; and
   displaying at least some of the collected performance metrics.

2. The method of claim 1, wherein executing the routines on the container orchestration objects in the container orchestration platform includes executing the routines for the benchmark actions of different container orchestration resource types of the same benchmark operation in parallel.

3. The method of claim 1, wherein the configuration file refers to a YAML file.

4. The method of claim 1, further comprising converting a Docket Compose file to at least some of the container orchestration resource types.

5. The method of claim 1, wherein spawning a routine for each benchmark action in the resource manager includes spawning the routine for each benchmark action in a thread pool of the resource manager that corresponds to the container orchestration resource type for that benchmark action.

6. The method of claim 1, further comprising sending the collected performance metrics to a metric monitoring and analytics service that facilitates viewing run results.

7. The method of claim 1, wherein collecting performance metrics includes registering events of interest and adding handlers for event callbacks, wherein each handler is configured to record client-side time and server-side timestamp for an event.

8. A non-transitory computer-readable storage medium containing program instructions for benchmarking a container orchestration platform in a computing environment, wherein execution of the program instructions by one or more processors causes the one or more processors to perform steps comprising:
   receiving a configuration file that specifies at least one benchmark operation having benchmark actions for different container orchestration resource types to be performed in the container orchestration platform;
   using data contained in the configuration file, creating a resource manager for each of the different container orchestration resource types specified in the configuration file, wherein at least some of the resource managers that are created include a container interface;
   spawning a routine for each benchmark action in the resource manager that corresponds to the container orchestration resource type for that benchmark action;
   executing the routines on container orchestration objects in the container orchestration platform;
   collecting performance metrics as the routines are executed; and
   displaying at least some of the collected performance metrics.

9. The non-transitory computer-readable storage medium of claim 8, wherein executing the routines on the container orchestration objects in the container orchestration platform includes executing the routines for the benchmark actions of different container orchestration resource types of the same benchmark operation in parallel.

10. The non-transitory computer-readable storage medium of claim 8, wherein the configuration file refers to a YAML file.

11. The non-transitory computer-readable storage medium of claim 8, wherein the steps further comprise converting a Docket Compose file to at least some of the container orchestration resource types.

12. The non-transitory computer-readable storage medium of claim 8, wherein spawning a routine for each benchmark action in the resource manager includes spawning the routine for each benchmark action in a thread pool of the resource manager that corresponds to the container orchestration resource type for that benchmark action.

13. The non-transitory computer-readable storage medium of claim 8, wherein the steps further comprise sending the collected performance metrics to a metric monitoring and analytics service that facilitates viewing run results.

14. The non-transitory computer-readable storage medium of claim 8, wherein collecting performance metrics includes registering events of interest and adding handlers for event callbacks, wherein each handler is configured to record client-side time and server-side timestamp for an event.

15. A system for benchmarking a container orchestration platform in a computing environment, the system comprising:
    memory; and
    at least one processor configured to:
        receive a configuration file that specifies at least one benchmark operation having benchmark actions for different container orchestration resource types to be performed in the container orchestration platform;
        using data contained in the configuration file, create a resource manager for each of the different container orchestration resource types specified in the configuration file, wherein at least some of the resource managers that are created include a container interface;
        spawn a routine for each benchmark action in the resource manager that corresponds to the container orchestration resource type for that benchmark action;
        execute the routines on container orchestration objects in the container orchestration platform;
        collect performance metrics as the routines are executed; and
        display at least some of the collected performance metrics.

16. The system of claim 15, wherein the at least one processor is configured to execute the routines for the benchmark actions of different container orchestration resource types of the same benchmark operation in parallel.

17. The system of claim 15, wherein the configuration file refers to a YAML file.

18. The system of claim 15, wherein the at least one processor is configured to convert a Docket Compose file to at least some of the container orchestration resource types.

19. The system of claim 15, wherein the at least one processor is configured to spawn the routine for each benchmark action in a thread pool of the resource manager that corresponds to the container orchestration resource type for that benchmark action.

20. The system of claim 15, wherein the at least one processor is configured to register events of interest and add handlers for event callbacks, wherein each handler is configured to record client-side time and server-side timestamp for an event.

\* \* \* \* \*